United States Patent
Lewis et al.

(10) Patent No.: US 8,601,907 B2
(45) Date of Patent: Dec. 10, 2013

(54) KNIFE BLADE MANUFACTURING PROCESS

(75) Inventors: Darrell Lewis, Lexington, KY (US); Craig Green, Sherwood, OR (US)

(73) Assignee: KAI U.S.A., Ltd., Tualatin, OR (US)

( * ) Notice: Subject to any disclaimer, the term of this patent is extended or adjusted under 35 U.S.C. 154(b) by 1528 days.

(21) Appl. No.: 11/236,315

(22) Filed: Sep. 26, 2005

(65) Prior Publication Data

US 2006/0090603 A1 May 4, 2006

Related U.S. Application Data

(60) Provisional application No. 60/612,938, filed on Sep. 24, 2004.

(51) Int. Cl.
*B21K 11/02* (2006.01)
(52) U.S. Cl.
USPC .......................................... 76/104.1
(58) Field of Classification Search
USPC ............ 76/104.1, 119, 106, 106.5, 56, 101.1; 264/274, 279; 419/8; 425/110
See application file for complete search history.

(56) References Cited

U.S. PATENT DOCUMENTS

| | | | |
|---|---|---|---|
| 2,974,941 A * | 3/1961 | Hobdell | 266/96 |
| 3,324,508 A * | 6/1967 | Dickinson | 425/126.1 |
| 3,905,723 A * | 9/1975 | Torti, Jr. | 416/241 R |
| 4,251,086 A * | 2/1981 | Woolley | 280/11.12 |
| 4,291,448 A * | 9/1981 | Cretella et al. | 29/889.1 |
| 5,077,002 A | 12/1991 | Fried | |
| 5,174,952 A * | 12/1992 | Jongenburger et al. | 419/23 |
| 5,215,946 A | 6/1993 | Minh | |
| 5,366,138 A | 11/1994 | Vela et al. | |
| 5,374,391 A | 12/1994 | Kuwabara et al. | |
| 5,523,049 A | 6/1996 | Terpstra et al. | |
| 5,528,834 A | 6/1996 | Seber et al. | |
| 5,722,306 A * | 3/1998 | Vela et al. | 76/101.1 |
| 5,864,955 A * | 2/1999 | Hirai | 30/350 |
| 5,985,208 A | 11/1999 | Zedalis et al. | |
| 5,989,493 A | 11/1999 | La Salle et al. | |
| 6,110,418 A | 8/2000 | Jablonski | |
| 6,315,935 B1 * | 11/2001 | Schoonover et al. | 264/109 |
| 6,350,407 B1 | 2/2002 | Sakata et al. | |
| 6,389,699 B1 * | 5/2002 | Ecer | 30/346.54 |
| 6,431,800 B1 | 8/2002 | Suzuki | |
| 6,696,376 B2 | 2/2004 | Niwa et al. | |
| 7,140,113 B2 * | 11/2006 | King et al. | 30/346.54 |
| 2002/0083598 A1 * | 7/2002 | Julien | 30/350 |
| 2003/0063993 A1 * | 4/2003 | Reiter et al. | 419/36 |

* cited by examiner

*Primary Examiner* — Robert Scruggs
(74) *Attorney, Agent, or Firm* — Seed IP Law Group PLLC (57) ABSTRACT

A process for forming knife blades such as for kitchen or sport knife use comprises injecting a compound including a binder and a metallic powder into a mold having a shape of the knife blade, removing a green blank from the mold and sintering the green blank to produce a sintered blank. The sintered blank is then subjected to a hot-isostatic-pressure to produce a finished blank. An insert may be placed in the mold to impose a desired feature, such as a logo or legend, on the green blank during the molding process. The mold is so configured as to changeably receive the insert so that a first series of blanks can be made using the insert, then a new insert may be emplaced to impose a different feature on succeeding blanks formed in the mold. An edge component may be placed in the mold, around which the blank is injected, to form a compound blade.

24 Claims, 4 Drawing Sheets

KNIFE BLADE MANUFACTURING PROCESS

CROSS-REFERENCE TO RELATED APPLICATION

This application claims the benefit of U.S. Provisional Patent Application No. 60/612,938 filed Sep. 24, 2004, and incorporated herein by reference in its entirety.

BACKGROUND OF THE INVENTION

1. Field of the Invention

The disclosed invention is related generally to the manufacture of knife blades, and in particular to blades manufactured employing metal injection molding and hot isostatic pressing.

2. Description of the Related Art

Among the commercial methods of manufacture of knife blades, the two most common are forging and stamping or blanking. In the first method, a steel blade is formed by a series of high pressure impacts to achieve a knife blank having a basic shape. The blank is then finished to remove extra material and impart a desired temper.

In the second method, a sheet of steel is subjected to a punching operation in which a blank having the desired shape is punched from the sheet. The blank is then ground to give it an edge, and other finishing steps are performed. Of the two methods, the first produces the higher quality blades, while the second is more economical.

BRIEF SUMMARY OF THE INVENTION

According to an embodiment of the invention, a method is provided for manufacturing a knife blade. The knife blade may be a sport knife blade, a kitchen knife blade, or another type of blade produced for commercial distribution.

The method includes injecting a compound including a binder and a metallic powder into a mold having a shape of the knife blade, removing a green blank from the mold and sintering the green blank to produce a sintered blank. The sintered blank is then subjected to a hot-isostatic-pressure (HIP) to produce a finished blank. In order to prevent curling or warping of the green blank, it may be placed in the sintering oven in an edge-up position.

Following the HIP process, the blade may be clamped during a heat treatment to remove any remaining distortion of the blade.

According to an embodiment of the invention, an insert is placed in the mold to impose a desired feature, such as a logo or legend, on the green blank during the molding process. The mold is so configured as to changeably receive the insert so that a first series of blanks can be made using the insert, then a new insert may be emplaced to impose a different feature on succeeding blanks formed in the mold.

According to an embodiment of the invention the compound injected into the mold includes a component selected to form a micro-tooth on the finished blade edge to enhance the blades cutting capability and durability. The component may be selected from among carbide, ceramic, and zirconia.

According to another embodiment, a preformed knife edge is placed in the mold prior to injecting the compound, such that the resulting finished blade is a compound blade having an edge of a different composition from the body of the blade.

DETAILED DESCRIPTION OF THE INVENTION

Metal-injection-molding (MIMming) is a process where a metallic powder is mixed with a binder and injected into a mold. The binder sets, and a product is removed from the mold. The product is subjected to a series of steps in which the binder is removed and the powder portion is sintered to form a metal component in the desired shape. Densities of above 90-95% can be achieved using this process. Advances in the field have resulted in the ability to manufacture knife blades of reasonable quality through MIMming. An advantage of this method of manufacture is that complex shapes can be imparted to a knife blank without the expense of previously known methods. one such method is described in U.S. Pat. No. 6,315,935, incorporated herein by reference in its entirety.

Another manufacturing process that has recently been employed in the manufacture of knife blades is the process of hot-isostatic-pressing (HIPping). This process involves placing powdered or solid metals or alloys into a sealed container. The container is subjected to immense pressure in the presence of a selected heat. The pressure may exceed 30-50,000 psi, and, in combination with the heat, is sufficient to cause a diffusion bond between the powdered metallic particles to form a solid metal billet having a near 100% density. The billet is then removed from the container and cut into blanks from which knife blades are formed. By employing this method, metals having different characteristics can be bonded together to provide composite parts. Such a method is disclosed in U.S. Pat. No. 6,110,418, incorporated herein by reference in its entirety.

The present inventor has recognized that, while each of the methods described above provides certain advantages, each also has disadvantages. In the case of MIMming, the density that can be achieved is not sufficient for some applications. In the case of HIPping operations, the process of cutting and finishing blades from billets is expensive and thus not suitable for knives intended for consumer sales.

Accordingly the inventor has developed a process that combines aspects of both MIMming and HIPping to produce knife blades that benefit from advantages of both processes. Combined MIMing and HIPping is currently employed in limited applications, such as formation of massive parts for the aviation industry, and for manufacturing artificial joints in the medical industry. However, these applications are generally directed to manufacturing parts having limited aspect ratios in their dimensions. It has been anticipated that the formation of a long narrow part such as a knife blade using such a combination of methods would be impractical, since the sintering and HIPping process can deform or crack such parts. The inventor found that this was indeed the case, but was able to develop a process to overcome the above mentioned difficulties.

Figure 1:
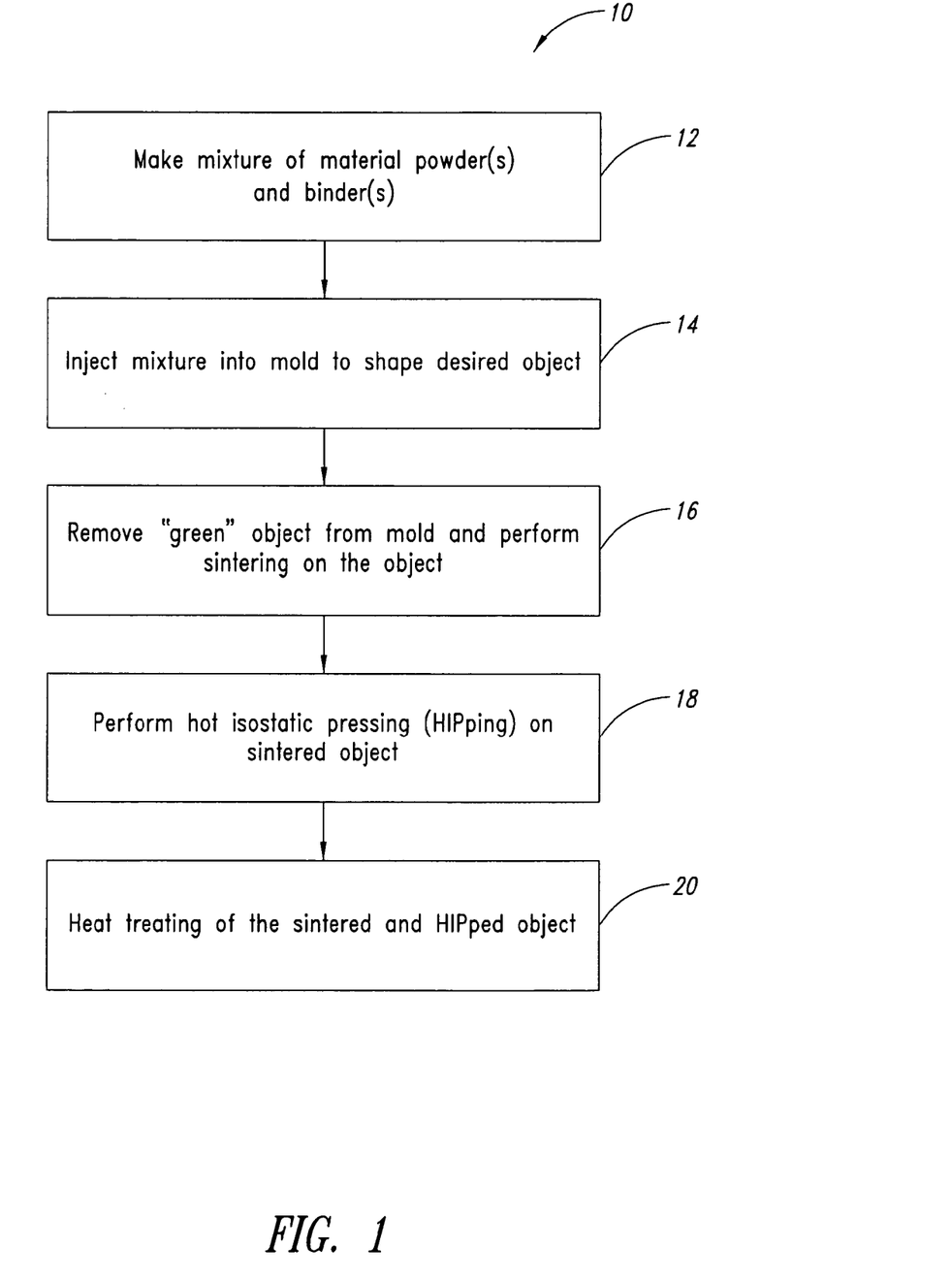
FIG. 1 is a block diagram showing the basic steps of a process according to an embodiment of the invention.

Referring to the block diagram of FIG. 1, the steps of an example of a process 10 are shown that may be used for the manufacture of knife blades, according to an embodiment of the invention. The steps in the process of include: making a mixture of one or more material powders and one or more binders, shown at 12; injecting the mixture into a mold giving shape to the knife blade, shown at 14; removing the "green" (raw) article from the mold and performing debinding and sintering on the article, shown at 16; performing hot isostatic pressing (HIPping) on the sintered article, shown at 18; and heat treating the sintered and HIPped article, shown at 20. The above outlined manufacturing process is described in more detail below.

The initial step (12) in the disclosed method involves mixing one or more powdered materials with one or more binders. The powdered materials are the compounds that will eventually make up the finished blade. The binders serve to assist in intermediate production steps by binding the powdered materials into a cohesive unit during work on the article. The powders may be metallic, ceramic, or any combination of materials thought to be useful in the manufacture of a particular article. In the present case, a "metal powder" may be a pure metal, an alloy, an intermetallic compound, or any mixture thereof. The metallic powders may be combined to form a stainless steel, a tool steel, high-carbon steel, a ceramic, a ceramic/steel mixture, or any other suitable powder mixture. As noted, the binder assists in shape-forming of a partially compressed unfired (or "green state") article that has gone through initial stages of compaction in a mold. Generally, the binder may be a gel-forming material, but any material that can perform a binding function may be used.

Upon mixing, the binder and metal powder may form a particulate mixture by themselves or with added other components. Other components may include, for example, desired solvents or additives to ease the working of the article or to change its physical characteristics. Generally, the mixture contains 50-60% metal powder, by volume. The binder makes up another 5% of the mixture, by volume, and a solvent provides the balance.

The binder may be present as a "binder mixture", including both the binding agent and any suitable solvent. The binding agent is, most commonly, an agar or agaroid compound. Other suitable binding agents include polysaccharides, polyethylenic compounds, polyvinyl acetic compounds, carboxylic polymers, and polyacetal compounds. Any appropriate binding agents, including those listed above, may be present in conjunction with a suitable solvent. For example, in the case of an agaroid binding agent, the solvent may simply be a polar solvent such as water or an alcohol. As an alternative to the above-noted binders, it may be possible to use a thermoplastic binder in a suitable solvent.

The particulate mixture, as mentioned above, may contain components beyond the metal powder, binder, and solvent. For example, the particulate mixture may contain a biocide to inhibit the growth of microorganisms during the manufacturing process. In another example, the mixture may contain a dispersant to ensure optimal mixing of the components of the article. As another example, the mixture may contain a gel strength-enhancing compound to make a more structurally-sound green article. This latter additive may be present in amounts near 1% of the volume of the solvent, and may be a member of the borate-class of compounds.

Once the components of the particulate mixture have been determined, they are completely mixed before being worked into a mold. A heated blender is a useful tool for mixing the injection compound. A heated blender efficiently forms a homogeneous mixture of the various components of the article and deals well with the high viscosity of the resultant particulate mixture. Though it may be easier to work a less-viscous mixture, a high-viscosity mixture has the advantage that the high solid concentration leads to a closer-to-net final product and to less shrinking and cracking of the worked article.

Once the particulate mixture has been formulated and made homogeneous, the mixture is used in a metal injection molding ("MIM") process. The MIMming process provides high volume, rapid production of metal articles, produces metal articles in a form that is close to their final, "net," shape, and may be used to fabricate metal articles having complex geometric shapes.

The raw particulate mixture of powder metal, binder, solvent, and any other additives, is injected (14) into a metal injection mold. This mold can be of any suitable shape for imparting to the powder metal the shape desired in the final metal article. In the present example, the mold is in the form of a knife blade. The mold itself may be of a compound that is yielding, yet elastic. The mold should be capable of ensuring dimensional accuracy to the finished piece yet still be flexible enough to withstand pressure and shape changes in the manufacturing process. Optionally, there may be occasions when it is advantageous to have a stronger mold or a mold with different performance characteristics. In such a case, the mold may be a metal shell or it may be machined into a metal block. In other cases, the mold may be resinous, and may be formed by casting around a master that has been designed with the desired final shape of the knife blade.

Once placed into a mold, the powder metal mixture is compressed into a raw, "green state" article resembling the final knife blade, though oversized. Depending on the conditions present at this stage, the "green" blade blank may undergo a mild densification due to various combinations of pressure and temperature. For example, the force needed to inject the particulate mixture into the mold may be enough to provide some initial compression and shaping to the particulate mixture as it is transformed into a "green" article. Any temperature changes made during the injection step may have a similar effect. For example, the particulate mixture may be injected at a temperature above the gelling point of the binder, in order to make the injection facile. This is referred to as a "hot supply" step. Subsequent to a hot supply step, the temperature in the mold is reduced during a "cool formation" step. In this later step, the temperature is lowered to a point below the gelling temperature of the binder; this cooling allows formation of a self-supporting article within the structure of the mold.

As noted earlier, the particulate mixture is initially placed into the metal injection mold. This is accomplished using any suitable procedure. For example, the metal injection mold may be filled with the particulate mixture using a simple gravity feed system. Alternatively, the metal injection mold may be filled with the particulate mixture using a pressurized injection system. In this latter system, the particulate mixture is injected into the mold at low pressure and at "low" temperatures. For example, if the gelling temperature of the binder is approximately 35° C., then the mixture might be injected at a temperature of 45° C. Performing the injection molding procedure at lower pressures and temperatures results in reduced wear on the injection machines and other parts of the assembly apparatus.

When the green blade blank has been formed and removed from its mold, the green blade blank undergoes further processing, including a sintering step (16). In this step, the green blade blank is subjected to conditions of vacuum and elevated temperature as a further step in transforming the green blank into a finished blade.

Sintering includes the bonding or welding of particles in the powder metal mixture at temperatures just below the melting or fusion point. Generally, sintering is performed on a green article that has recently been removed from a mold. In an initial step, labile solvent is removed under low-to-moderate temperature conditions. The sintering temperature is then raised to higher levels and solvent removal continued, with simultaneous removal of the binding agent.

The conditions used in sintering depend on the desired outcome of the sintering step and considerations as to time. For example, it may be possible to use a gaseous acid in the sintering step so that the sintering may be done at lower temperature while still providing for complete solvent and binder removal. In addition, the procedure may be performed in an enriched hydrogen atmosphere as a way to reduce oxidation during the debinding and sintering steps. Finally, the type of metal powder, binder, solvent, and additives used may dictate the combinations of temperature and time necessary to complete this step.

The effects of the sintering step are the complete removal of organic material from the green blank and an increase in the material density. It is expected that an efficient sintering step results in the metal article approaching 90-95% of its theoretical density as repacking and reductions in porosity occur by way of mass movements. Changes in the physical characteristics of the green blank during the sintering step result in the sintered blank being very near to "net" size and density.

Next, a hot isostatic pressing (HIPping) step is applied to the sintered knife blank (18). In HIPping, the sintered blank is subjected to further extremes of temperature and pressure to maximize the physical performance characteristics of the knife blade.

Hot isostatic pressing is performed in a sealed pressure vessel. The pressure vessel is generally cooled to keep it from undergoing thermal damage as a high-temperature process is carried out within the vessel. The pressure vessel contains a heated furnace, which is thermally insulated from the pressure vessel itself (as noted), and preferably is capable of reaching temperatures exceeding 2000° C. An inert gas, such as argon or helium is used in the pressure vessel. The inert gas is forced into the pressure vessel at high pressures, and then the pressure is raised even further as a result of heating by the furnace. Very-high-pressure pulses of relatively short duration may be applied to the knife blank during heat production by the furnace.

As noted for the combination of debinding and sintering, a hot isostatic pressing process may be modified in many ways, including changing the variables of temperature, pressure, and time to achieve desired properties of the knife blank.

Hot isostatic pressing has a substantial effect on the final characteristics of the final blade. The combination of high temperature and high pressure results in a further increase in the density of the blade blank, even approaching 100% of its theoretical density with an appropriate HIPping protocol. Because the blade blank may have been substantially finished with the combination of sintering and HIPping, it may also be true that the blank that comes out of the HIPping process is a net object. Optionally, the blank may be worked further to the satisfaction of the manufacturer.

There are other advantages resulting from performing both sintering and HIPping on a knife blade blank. For example, the quantitative nature of the MIMming and HIPping processes (as they relate to variables such as time, temperature, and pressure) allow multiple batches of blades to be made with substantial uniformity across batches. In addition, the use of the molding process may be used to produce intricate and complex metal articles, as will be discussed further below. Further, regimes of high temperature and pressure used in these processes produces strong bonding between materials whether the particulate mixture contains like materials (two metals) or unlike materials (metal and ceramic). Some or all of the disclosed process may allow for novel combinations of materials to be worked into simple or complex shapes associated with some designs knives.

According to the described embodiment, the process begins with the design of a knife blade with desired physical features, including the composition of the knife blade (the powder mixture). A mold is made based on a selected design of the blade, and a powder mixture injected into the mold. A "green" (unprocessed) knife blade blank is the result of the injection molding step, which blank is in a nearly-net size and shape.

Once the green blank has been removed from the injection mold, the blank is sintered, or placed in a vacuum furnace and subjected to high temperature and vacuum. A purpose of this step, as noted earlier, is to increase the density of the knife blade by burning off binding material and solvent. The sintered blade blank is then be placed into a "HIPping furnace" for hot isostatic pressing ("HIPping").

The HIPping furnace subjects the blade to a further temperature and high-pressure treatment. The furnace is filled with an inert gas, preferably argon or helium, and the gas is heated. Heat-induced expansion of the gas provides further very high compression forces upon the knife blade, which may exceed a pressure of approximately 32,000 pounds per square inch. The combination of further heat treatment and high pressure serves to increase the density of the knife blade to near 100% of the theoretical maximum density, and serves to further strengthen the bond between the materials in the knife blade, even if they are dissimilar.

At this point, the knife blade may go through a finishing process, such as secondary machining. Also, the blade may undergo a further heat treatment to provide a desired temper to the blade or portions thereof. Finally, the blade may be honed, polished, bead blasted, or otherwise treated to provide a desired surface appearance.

As mentioned above, one of the difficulties to be overcome was the problem of warping of knife blades during the sintering and HIPping processes. Typically, a component to be sintered is placed in the sintering oven on its broadest side to minimize shape deformation caused by the weight of the object on the support surface. However, it was found that the sintering process, especially, tends to cause the blade to shrink unevenly, resulting in significant and unacceptable curl in the blade. By providing a rack configured to hold blades upright in the sintering oven, with their edges upward, the shrinkage is more even, and warping is minimized. Nevertheless, following the sintering and HIPping, the blades may retain a small amount of distortion. Any remaining distortion can be corrected during a heat treatment step, in which the blades are rigidly clamped between blocks while heated. When cooled, the blades remain in the straightened condition imposed by the blocks.

Figure 2:
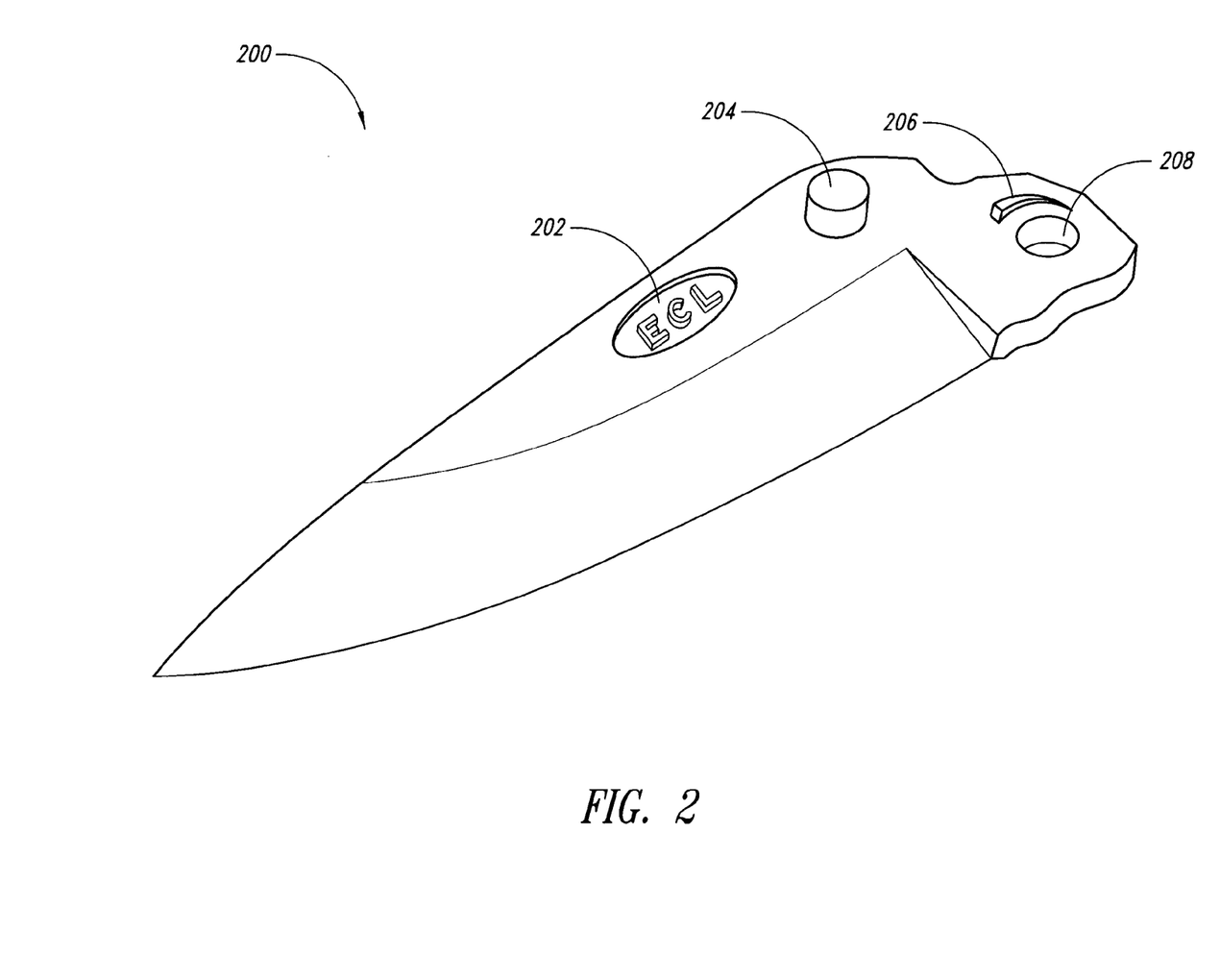
FIG. 2 shows a sport knife blade manufactured according to an embodiment of the invention.

Referring now to FIG. 2, a knife blade 200 is shown according to an embodiment of the invention. The blade 200 includes various three dimensional features represented by a monogram 202, a thumb stud 204, an engagement feature 206 for an assisted opening mechanism, and a pivot aperture 208. The formation of such features during the molding process, as previously described, provides a great economic advantage over traditional manufacturing processes, since such features were previously formed during additional steps following the formation of a knife blank, which increased the cost of manufacture. In the present case, the blade is in virtually its net shape upon removal from the HIPping vessel. A small amount of machining may be required, especially to the pivot aperture, to produce an ideal part, but overall, very little additional work is required to produce a final product.

In the case of typical sport knives, such knives are frequently provided with text or symbols on the blade, here represented by the monogram 202. Where such features were previously engraved or etched into a knife blade, according to an embodiment of the present embodiment, they are cast as part of the molding process. This permits the formation of deep and sharp detail having a dimensionality that was previously impractical for commercial production. Furthermore, the features may be formed having portions that lie in different planes or depths, i.e., a portion may be incised into the blade, while another portion may extend beyond the plane of the surface of the blade.

Another advantage is that the features to be formed in the blade may be defined by replaceable inserts placed in the mold prior to the injection process. It is not uncommon for a manufacturer to produce knives of a particular design for a number of different customers, each of whom requires a different graphic to be placed on the blade. For example, a sporting goods retailer may require its own logo to be placed on the blades of knives it sells, while another vendor may require a different image on the blades of knives having an otherwise identical design. According to the present embodiment, the manufacturer can simply change the insert after forming the required number of blades for one customer, and thereby inexpensively convert to the image of the next customer.

Many local health codes include specific requirements for cutlery used in commercial kitchens, directed to features such as the joint between the blade and handle of a knife. In order to prevent food particles from being introduced into a space between the blade and the handle, a bolster is required, having a sealed joint between the blade and bolster. This reduces the danger of microorganisms persisting on a knife during and after cleaning, and contaminating food.

According to known methods, blades having bolsters are either forged as a unit, or the bolsters are formed as separate parts, then welded or otherwise bonded to the blade and tang. The integral bolster is a superior design, but is more expensive to produce.

Various organizations and services provide certification for products that meet or exceed certain minimum health and safety standards, and certification by such an organization is required in many jurisdictions for implements used in commercial kitchens. For example, NSF International® is an organization that provides such certification, and authorizes the use of its trademark logo on products that are so certified.

Figure 3:
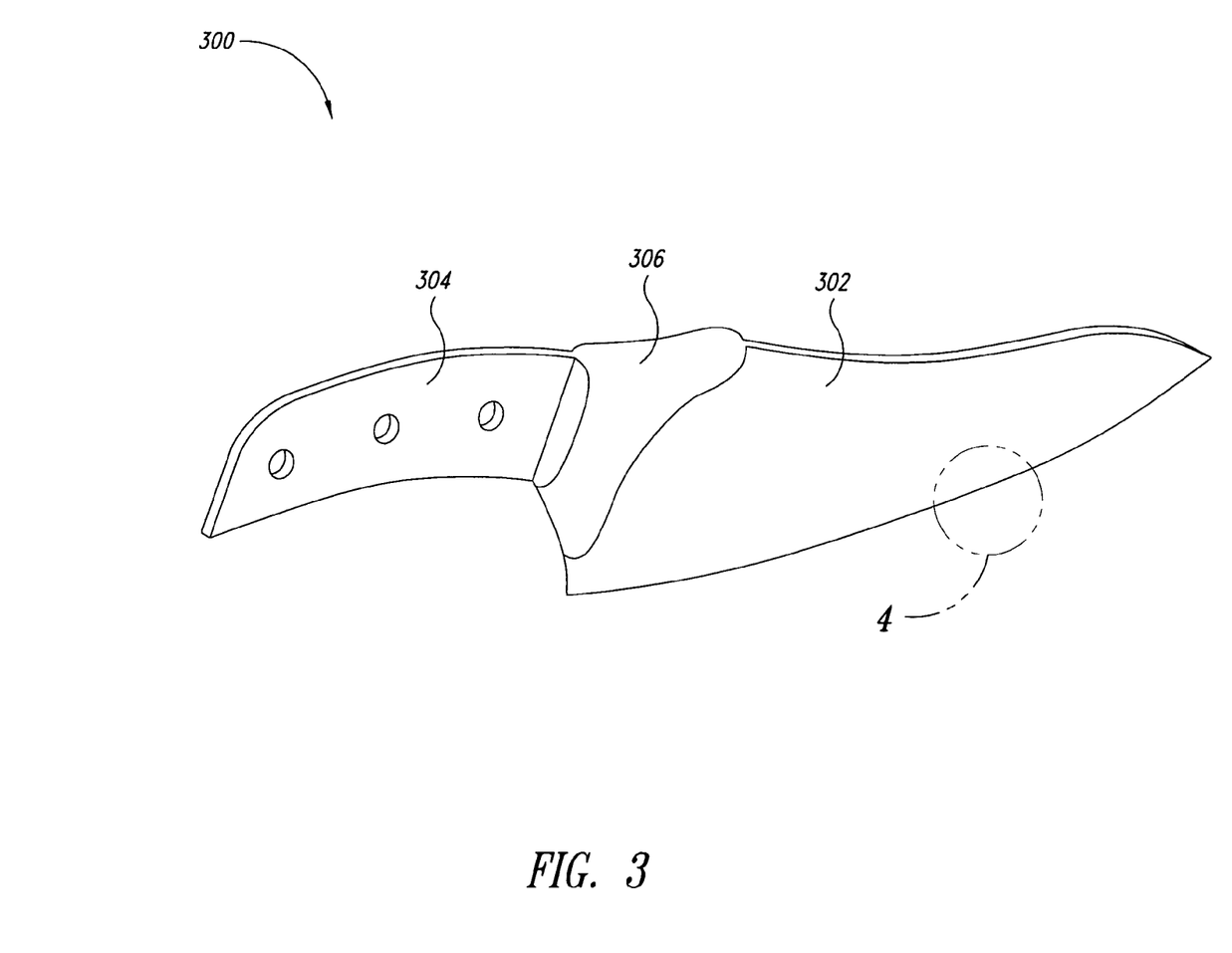
FIG. 3 shows a kitchen knife blade manufactured according to another embodiment of the invention.

FIG. 3 shows a kitchen knife 300 according to another embodiment of the invention. The knife 300 includes a blade 302, a tang 304, and a bolster 306 formed in a single casting procedure in a MIM/HIP operation as described with reference to the process of FIG. 1. Such a knife blade provides the advantages of the integral blade-bolster without the expense associated with forged cutlery. The resulting knife blade can meet the NSF standards for cutlery, while being much less expensive to produce than a traditional bolstered blade. It will be recognized that the same process may be employed to manufacture other kitchen tools, such as meat forks, spatulas, etc.

Another advantage of the present invention is that exotic blends of ingredients may be formulated into alloys that would otherwise be prohibitively expensive or even impossible to produce using conventional techniques. Some such ingredients include vanadium, chromium, molybdenum, titanium, and certain ceramic materials.

Figures 4, 5, 6:
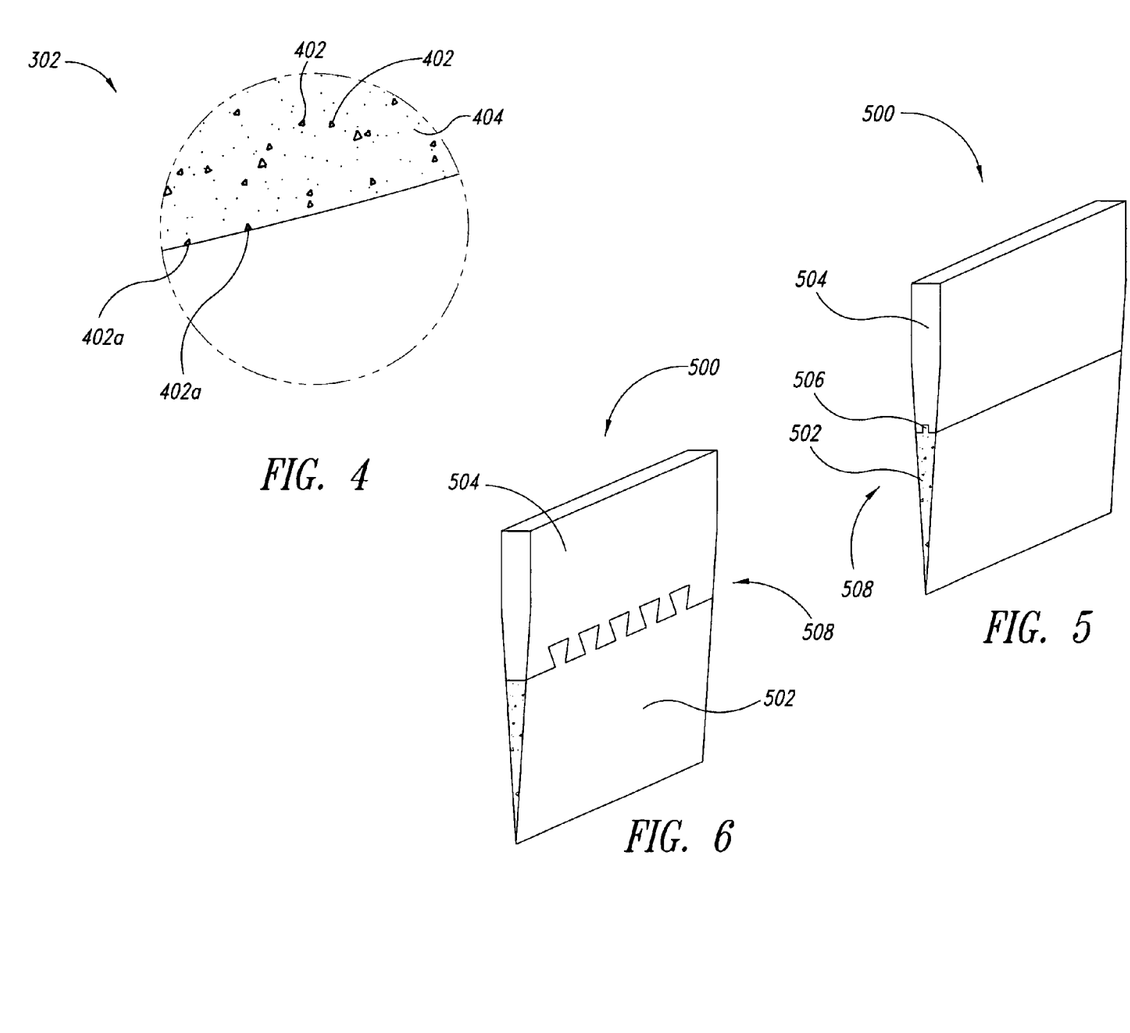
FIG. 4 shows an enlarged view of the knife blade of FIG. 3.
FIG. 5 illustrates a portion of a knife blade according to an additional embodiment.
FIG. 6 illustrates an a portion of a knife blade according to an alternate embodiment.

FIG. 4 illustrates an enlarged portion of the knife blade 302 of FIG. 3, according to another embodiment of the invention. As shown in FIG. 4, the mixture that is injected into the mold (see steps 12 and 14, above) includes a percentage of powder of a hard substance, as compared to most of the metallic powder in the mixture. For example, the hard substance may be carbide, ceramic, or zirconium, while the majority of the powder includes a steel alloy. The ratio is selected such that, when the MIM/HIP process is complete, particles 402 of the hard material are bound in a matrix of the steel alloy 404. When the knife edge is honed, particles 402a of the harder material are exposed at the edge, and provide a "micro-tooth" edge to improve the cutting characteristics of the blade 302. Because the harder material will wear at a different rate than the rest of the knife edge, the knife will retain an effective cutting edge longer than a typical knife. Additionally, the ratio may be varied to produce an edge having particular characteristics.

FIG. 5 shows a short portion of a knife blade 500 according to another embodiment of the invention. The knife blade 500 is formed of two separate component parts joined in a complex mechanical joint. An edge component 502 and a body component 504. The method of formation of the blade 500 is similar to the process described with reference to FIG. 1. However, the edge component 502 is first formed in a separate injection molding step, and provided with a tongue 506. The edge component 502 is then inserted into a second mold and the body component 504 is cast around the edge component 502 such that a tongue and groove joint 506 is formed between them. The composite blade 500 is then removed from the mold, sintered, and HIPped as described above. in this way, the edge component 502 can be formed using a mixture selected to provide optimal cutting characteristics. It may include a micro-tooth mixture such as that described with reference to FIG. 4, or some other selected mixture. Meanwhile, the blade body 504 can be formed using a mixture optimized for other characteristics. For example, it may be desirable to have a lightweight blade, in which case a titanium mixture may be chosen. In other cases, it may be desirable to have a blade with increased flexibility, stiffness, hardness, or other characteristic, according to a particular intended use. Such characteristics will dictate the selection of the mixture used in forming the body 504.

It will be recognized that the blade 500 described above can be formed in the opposite order; that is, that the blade body 504 may be preformed, and the blade edge 502 cast on the body.

According to an embodiment, The edge 502 is inserted into the mold as a green, unsintered part. According to alternate embodiments, the edge 502 is previously sintered or HIPped, then inserted into the mold.

The tongue 506 may have straight sides as shown in FIG. 5, or the sides may be sloped to form a dovetail style joint. Alternatively, as illustrated in FIG. 6, the joint 508 may be transverse to the blade 500, such that characteristics of the joint are visible along the blade. Such a method may be chosen for aesthetic reasons. In one embodiment, the blade body 504 is later anodized to provide a desired color on the surface, the blade having been formed using a metal or alloy selected for that purpose. An attractive contrast is thus provided between the edge and body of the finished blade 500.

From a structural point of view, the strength of such a joint is useful mainly during the manufacturing process; once the blade has been HIPped, a diffusion bond is formed that is much stronger than the mechanical joint.

Although processes have been shown and described with reference to the foregoing operational principles and embodiments, it will be apparent to those skilled in the art that various changes in form and detail may be made. Embodiments may include various combinations and sub-combinations of disclosed features, functions, elements, and/or properties. Such embodiments are regarded as being included within the subject matter of the present disclosure.

Examples of manufacturing processes using similar technologies may be found in U.S. Pat. Nos. 5,077,002; 5,174,952; 5,215,946; 5,366,138; 5,374,391; 5,523,049; 5,722,306; 5,985,208; 5,989,493; 6,110,418; 6,315,935; 6,350,407; 6,431,800; and 6,696,376.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for manufacturing a knife blade, comprising:
placing a preformed knife edge into a mold having a shape of the knife blade, the shape including a tang end, a point end opposite the tang end, an edge extending from adjacent to the tang to the point end, and a back opposite the edge;
injecting a compound including a binder and a metallic powder into the mold;
removing a green blank from the mold;
placing the green blank in a sintering oven;
sintering the green blank in an edge-up configuration to produce a sintered blank; and
subjecting the sintered blank to a hot-isostatic-pressure to produce a finished blank.

2. The method of claim 1, comprising:
clamping the finished blank between blocks such that shape distortion of the blade is corrected; and
subjecting the clamped blank to a heating process.

3. The method of claim 1, comprising finish machining a pivot hole of the finished blank.

4. The method of claim 1, comprising placing an insert into the mold prior to injecting the compound.

5. The method of claim 4, comprising replacing the insert with a different insert, then repeating the injecting step.

6. The method of claim 1 wherein the compound includes a component selected from among carbide, ceramic, zirconia, chromium, molybdenum, and titanium, proportions of the component and the metallic powder being such that, following the sintering step, particles of the component are bound in a metal matrix formed by the metallic powder during the sintering step.

7. The method of claim 1 wherein the preformed knife edge is a green knife edge blank.

8. The method of claim 1 wherein the preformed knife edge is a sintered knife edge blank.

9. The method of claim 1 wherein the preformed knife edge is a finished knife edge blank.

10. The method of claim 1 wherein the preformed knife edge includes a tongue configured to comprise a tongue and groove joint with a body of the knife blade.

11. The method of claim 1 wherein the mold includes a shape of a bolster such that a knife blade formed therewith includes an integral bolster.

12. The method of claim 1 wherein the mixture contains more than 50% metal powder, by volume.

13. A method comprising:
placing a preformed knife edge into a mold having the shape of a knife blade;
injecting a mixture into the mold;
hardening the mixture and bonding the mixture and preformed knife edge to obtain a complete knife blade; and
sintering the knife blade to anneal the mixture and the preformed knife edge.

14. The method of claim 13, wherein the sintering step comprises sintering the knife blade in an edge-up configuration.

15. The method of claim 13, comprising subjecting the knife blade to a hot isostatic press process.

16. The method of claim 13 wherein the preformed knife edge includes a joining feature configured to be engaged by the mixture to form a mechanical joint in the knife blade.

17. A method for manufacturing a knife blade, comprising:
forming a mixture including a binder, a powdered steel alloy, and particles of a second material, a proportion of the powdered steel alloy and the particles of the second material being selected such that, in a resulting knife blade, individual particles of the second material are bound in a matrix of the steel alloy;
placing a preformed knife edge into a mold having the shape of the knife blade;
injecting the mixture into the mold;
hardening the mixture in the mold to form a self-supporting green blank in the shape of the knife blade;
sintering the green blank to remove the binder and form a blade blank; and
subjecting the blade blank to a hot-isostatic-pressure.

18. The method of claim 17, further comprising heat treating and machining the blade blank.

19. The method of claim 17 wherein the second material is a substance that is harder than the powdered steel alloy.

20. The method of claim 19 wherein the majority of the powder is steel alloy.

21. The method of claim 20 wherein the second material includes a ceramic.

22. The method of claim 17 wherein the sintering step comprises sintering the green blank in an edge-up configuration.

23. A method of manufacturing a knife blade, comprising:
positioning a knife blade edge in a mold having a shape of a knife blade;
injecting into the mold with the knife blade edge a mixture including a metallic powder and a binder to produce a knife blade blank including the knife blade edge and the mixture;
removing the knife blade blank from the mold; and
sintering the knife blade blank to remove the binder from the mixture and fuse the particles of metallic powder.

24. A method of manufacturing a knife blade, comprising:
positioning a knife blade body in a mold having a shape of a knife blade;
injecting into the mold with the knife blade body a mixture including a metallic powder and a binder to produce a knife blade blank including the knife blade body and a knife blade edge comprising the mixture;
removing the knife blade blank from the mold; and
sintering the knife blade blank to remove the binder from the mixture and fuse the particles of metallic powder.

* * * * *

UNITED STATES PATENT AND TRADEMARK OFFICE
CERTIFICATE OF CORRECTION

| | | |
|---|---|---|
| PATENT NO. | : 8,601,907 B2 | Page 1 of 1 |
| APPLICATION NO. | : 11/236315 | |
| DATED | : December 10, 2013 | |
| INVENTOR(S) | : Lewis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1861 days.

Signed and Sealed this
Twenty-first Day of April, 2015

Michelle K. Lee
*Director of the United States Patent and Trademark Office*